US012657388B2

(12) United States Patent
Bullock et al.

(10) Patent No.: US 12,657,388 B2
(45) Date of Patent: *Jun. 16, 2026

(54) SYSTEMS AND METHODS FOR DETECTING EMERGING EVENTS

(71) Applicant: Calabrio, Inc., Minneapolis, MN (US)

(72) Inventors: Catherine Bullock, Minneapolis, MN (US); Boris Chaplin, Medina, MN (US); Kyle Smaagard, Forest Lake, MN (US); Chris Vanciu, Isle, MN (US); Dylan Morgan, Minneapolis, MN (US); Matt Matsui, Minneapolis, MN (US); Paul Gordon, Minneapolis, MN (US); Laura Cattaneo, Rochester, MN (US)

(73) Assignee: Calabrio, Inc., Minneapolis, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/594,700

(22) Filed: Mar. 4, 2024

(65) Prior Publication Data

US 2024/0378387 A1     Nov. 14, 2024

Related U.S. Application Data

(63) Continuation of application No. 18/064,891, filed on Dec. 12, 2022, now Pat. No. 11,922,122.
(Continued)

(51) Int. Cl.
*G06F 40/289* (2020.01)
*G06F 40/30* (2020.01)
*H04M 3/51* (2006.01)

(52) U.S. Cl.
CPC ............ *G06F 40/289* (2020.01); *G06F 40/30* (2020.01); *H04M 3/5183* (2013.01)

(58) Field of Classification Search
CPC ..... G06F 40/289; G06F 40/30; H04M 3/5183
See application file for complete search history.

(56) References Cited

U.S. PATENT DOCUMENTS

| | | | | |
|---|---|---|---|---|
| 8,918,399 | B2 * | 12/2014 | Marik | ..................... G06F 16/00 707/738 |
| 2009/0083251 | A1 * | 3/2009 | Sahasrabudhe | ........ G06Q 40/06 707/999.005 |

(Continued)

FOREIGN PATENT DOCUMENTS

JP          7272531 B2 *  5/2023

OTHER PUBLICATIONS

Zhou, P., Luo, Y., Ning, N., Cao, Z., Jia, B., & Wu, B., "Continuous similarity learning with shared neural semantic representation for joint event detection and evolution.", 2020, Computational Intelligence and Neuroscience : CIN, 2020 (Year: 2020).*

(Continued)

*Primary Examiner* — Eric Yen

(57)          ABSTRACT

Aspects of the present disclosure relate to systems and methods for detecting emerging events. In various examples, a method for detecting emerging events includes obtaining communication data associated with communication between multiple sources, segmenting communication data into multiple segments, determining whether a data segment belongs to a familiar topic or none, and generating a notification when a familiar topic is mentioned for more or less than a mention prediction. Additionally, or alternatively, a notification may be generated when an unfamiliar topic emerges from a set of unfamiliar data segments if an associated segment count exceeds a critical mass threshold. To determine whether a data segment belongs to a familiar topic, the data segment may be transformed into a feature (Continued)

vector and mapped onto a feature space, where a distance-based similarity score may be determined.

20 Claims, 10 Drawing Sheets

Related U.S. Application Data

(60)  Provisional application No. 63/294,974, filed on Dec. 30, 2021.

(56)  References Cited

U.S. PATENT DOCUMENTS

| | | | |
|---|---|---|---|
| 2011/0219001 A1* | 9/2011 | Marik | G06F 40/30 |
| | | | 707/738 |
| 2018/0287982 A1* | 10/2018 | Draeger | H04L 51/216 |
| 2019/0043506 A1* | 2/2019 | Rivkin | G06N 3/08 |
| 2019/0095521 A1* | 3/2019 | Milleron | G06F 16/313 |
| 2020/0134058 A1* | 4/2020 | Liu | G06F 16/2379 |
| 2021/0049923 A1* | 2/2021 | Brinton | G09B 7/00 |
| 2021/0266473 A1* | 8/2021 | Engelke | G06F 40/169 |
| 2022/0180465 A1* | 6/2022 | Cheng | G06F 17/16 |
| 2022/0230089 A1* | 7/2022 | Peraud | G06N 3/082 |
| 2022/0414123 A1* | 12/2022 | Cakaloglu | G06Q 50/01 |
| 2023/0116492 A1* | 4/2023 | Zhuang | G06F 16/355 |
| | | | 704/9 |

OTHER PUBLICATIONS

Google Translation of JP 7272531 B2, https://patents.google.com/patent/JP7272531B2/en?oq=JP+7272531+B2 (Year: 2021).*

\* cited by examiner

200

SYSTEMS AND METHODS FOR DETECTING EMERGING EVENTS

This application claims priority to U.S. Provisional Application No. 63/294,974, filed Dec. 30, 2021, titled "Systems and Methods for Detecting Emerging Events," the entire disclosures of which is hereby incorporated herein by reference.

BACKGROUND

Determining inferences from communication data may typically be a manual process requiring significant time and resources. For example, a contact center may ask call agents to manually categorize call content after each call based on the call agent's own judgment, which is not only inefficient but also error-prone at least owing to variations in call agents' experience, knowledge, and acumen. While call agents may be provided with a listing of selectable options to help with the categorization process, it remains difficult for agents to categorize calls accurately and reliably. Further, such challenges may be increased for calls related to multiple topics and/or unfamiliar topic(s). It is therefore extremely challenging to determine any meaningful inference, such as an emerging event, from communication data using traditional means.

It is with respect to these and other general considerations that embodiments have been described. Also, although relatively specific problems have been discussed, it should be understood that the embodiments should not be limited to solving the specific problems identified in the background.

SUMMARY

Aspects of the present disclosure relate to systems and methods for detecting emerging events. In various examples, a method for detecting emerging events may include obtaining communication data associated with communication between multiple sources, segmenting communication data into multiple segments, determining whether a data segment belongs to a familiar topic or not, and generating a notification when a familiar topic is mentioned for more or less than a mention prediction. Additionally, or alternatively, a notification may be generated when an unfamiliar topic emerges from a set of unfamiliar data segments if an associated segment count exceeds a critical mass threshold. To determine whether a data segment belongs to a familiar topic, the data segment may be transformed into a feature vector and mapped onto a feature space, where a distance-based similarity score may be determined.

This Summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

DETAILED DESCRIPTION

Figure 1:
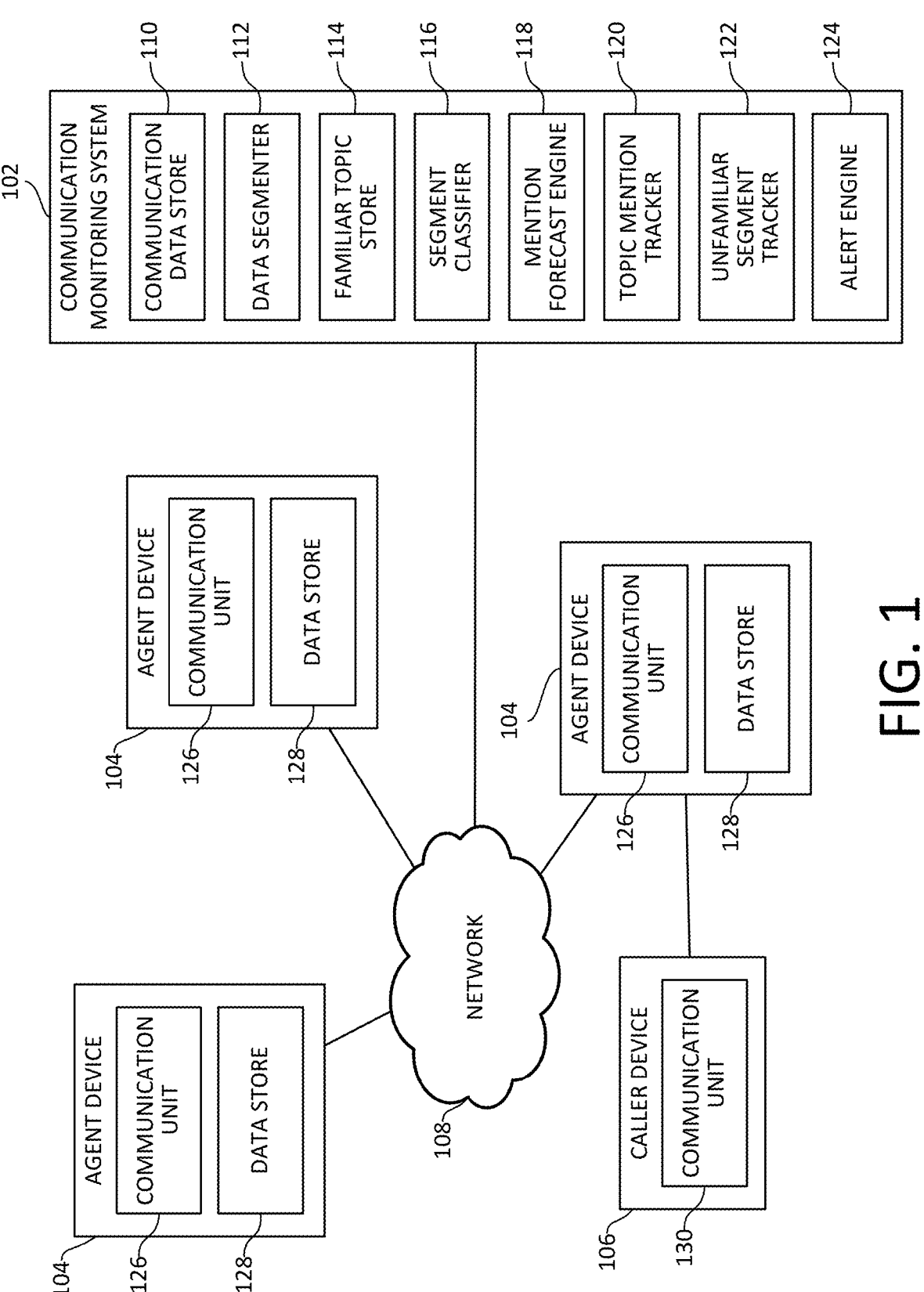
FIG. 1 illustrates a simplified view of an example system for detecting emerging events according to aspects described herein.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems, or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

Determining inferences from communication data may typically be a manual process suffering from inconsistent communication categorization and inefficiency. According to various aspects of the present disclosure, inferences such as emerging events may be automatically identified from communication data with no or minimal manual review. For example, a method for detecting emerging events may automatically obtain and process communication data (e.g., text or transcribed audio) between multiple parties to identify topics mentioned in the communication data. A trained topic identification model (e.g., a machine learning model) may be used to automate such topic identification. In some examples, communication data may be segmented into segments and matched with a familiar topic or identified as an unfamiliar data segment (e.g., as belonging to none of the familiar topics). Once the data segments are classified, the method may further include monitoring a mention count, a rate of mention, and/or an acceleration of mention, or a cluster size (for unfamiliar data segments). Further, notifications may be generated when mentioning falls outside of mention forecasts. The notifications may include pertinent information that may aid a recipient to review the "event" and/or to construct appropriate response strategies. Such automated process for determining inferences reduces or eliminates inconsistencies and inaccuracies caused by intrinsic limitations associated with a manual review process, such as variations among manual reviewers.

As an example, for a contact center to identify, based on communication data, inferences such as trends and changes in familiar and/or unfamiliar topics, traditionally this would be an overwhelming task, if not impossible, given the sheer volume of calls. Even if a contact center has the resources to manually sieve through each call, such a manual process tends to involve an army of reviewers with subjective interpretations. Furthermore, the manual process is highly inefficient and ineffective. Additionally, such manual process could only be done retroactively, after sufficient calls have been taken and analyzed, making it difficult to identify inferences from a stream of data. At least for those reasons, an automated and standardized process for detecting emerging events from communication data continuously, in real-time, or near real-time, and/or while new communication data are obtained.

Additional advantages of adapting an automated and standardized process for detecting emerging events include reducing or eliminating human-error caused by the lack of sound understanding of familiar topics, reviewers' inability to accurately discern multiple topics and/or unfamiliar topics. It is especially difficult to identify new topics as reviewers would normally not find them on a pre-existing listing of topics. Thus, frequent new topic training may be required to educate reviewers in their manual transcript searching. The automatic detection of emerging events of the present disclosure is capable of identifying new trends based on changes in mentioning frequency for familiar topics and/or a surge of mentioning of unfamiliar topics. The systems and methods of the present disclosure may further be industry-agnostic, requiring no specific domain knowledge in the automatic identification of topics. In some examples, identified topics may further guide the generation of a summary for a contact (e.g., call).

Aspects of the present disclosure relate to detecting emerging events by identifying a change in ideas, concepts, and/or topics mentioned in a stream of communication data, which may include text data or transcribed audio data. For example, a change may be captured when the number of mentions, the rate of mentions, and/or the acceleration of mentions about a familiar topic increased or decreased beyond a certain allowable level. Additionally, or alternatively, a change may be captured when the number of mentions, the rate of mentions, and/or the acceleration of mentions about an unfamiliar topic exceeds or meets a certain target level.

An example scenario where mentions of a familiar topic may change is following a software update that is pushed to users of the software or an associated product. Specifically, users may, as a result of the software update, experience more issues of certain types and thus have expressed those issues (e.g., to a contact center) more frequently than in past communications. An example scenario where mentions of an unfamiliar topic may increase is following a new disease or illness outbreak, such as at a populated venue (e.g., a cruise line), where multiple parties (e.g., patrons or passengers) have expressed the same type of symptoms or illnesses not typically mentioned in past communications. In both scenarios, methods and systems of the present disclosure may identify such abnormal "emerging events" and trigger the generation and transmission of alerts such that a receiving entity (e.g., response center, management, stakeholder, etc.) may review the events and/or formulate an appropriate response. In some examples, the alerts may include pertinent information and/or recommendations to help the receiving entity address the situations, such as by notifying the appropriate personnel (e.g., network specialists) to resolve any issues, or by notifying external entities (e.g., public health agencies) to contain the problem. In certain examples, aspects disclosed herein may use the associated set of keywords to navigate communication data, such as via a transcript search function having search and/or filter functions.

Aspects of the present disclosure relate to detecting topics from communication data, which may include a stream of text, an image, and audio stream, and/or a video stream. In various examples, topics are detected using a trained topic identification model (e.g., an embedding model) trained to transform communication data into feature data. The communication data may first be segmented into a plurality of segments associated with one or more sentences. The topic identification machine learning model may next take the segment of communication data as input and output one or more items of feature data to represent the segment of communication data. Topics may be associated with a set of features, which may guide the topic identification model to identify one or more topics mentioned in the segment of communication data. In some examples, density-based clustering may be used to help associate topics to features and/or to identify topic(s) mentioned in a segment of communication data.

In various examples, a topic may be generic, industry-specific, company-specific, customer-specific, region-specific, season-specific, culture-specific, and/or language-specific. In certain examples, a topic may be represented by a set of keywords, which may be the keywords that are related to the topic, significant to the topic, important to the topic, etc. The set of keywords may be determined using word comparison and stemming, such that the keywords closest in meaning but different from one another are selected as the set of keywords to represent a topic. That is, the set of keywords may be conceptually salient but not textually similar to each other. As examples, a topic may be labeled as [Pen/Pencil/Highlighter], [Lasagna/Spaghetti/Tomato], [Smartphone/Tablet/Watch], [Reboot/Error/Reinstall], [Motor/Engine/Mechanic], [Vendor/Dealer/Distributor] or [Resistor/Electrical/Wiring]. In contrast, a topic would not be labeled as [Email/Emailing/Emails] but [Email/Send/Inbox]. Such topic labeling mechanisms help prevent communications of the same topic be artificially categorized into multiple similarly or relatedly named topics. Manual intervention may be used to further improve identifying and/or labeling of the topics. Additionally, or alternatively, the set of keywords may include one or more phrases representative of a topic, such as [License Configuration Tool], [COVID Response Center], or [Sanchez Art Center].

Aspects of the present disclosure relate to establishing a set of familiar topics for new communication data to be compared against. In examples, historic communication data may be obtained, and the set of familiar topics may be identified based on the historic communication data. After the set of familiar topics are identified, new communication data, which may be associated with a recent or current time period, may be obtained and processed to identify whether one or more familiar topics are mentioned. The new communication data may be segmented into utterances, sentences, and/or sentence fragments, such that a topic may be identified for a segment. The new communication data may be automatically obtained and processed, for example upon the completion or during the duration of a call at a call center. Each new data segment may be determined as belonging to a familiar topic or as a nonfamiliar segment belonging to none of the familiar topics. The comparison may be based on their semantic similarity and/or features extracted using the topic identification model. One of skill in the art will appreciate that many different levels of segmentation granularity can be practiced with the aspects disclosed herein without departing from the scope of this disclosure. Furthermore, while examples discussed herein are provided in the context of textual or audio content, one of skill in the art will appreciate that the techniques disclosed herein may be employed when working with other content formats, such as images, video, etc.

Aspects of the present disclosure includes transforming a segment of communication data into a feature vector and mapping the feature vector onto a feature space. In some aspects, one or more familiar topics may be represented by one or more familiar topic feature vectors mapped onto a feature space, where a familiar topic feature vector corresponds to a historic communication data segment of the familiar topic. New communication data may next be segmented into segments and transformed into a current feature vector. A current feature vector may next be mapped onto the feature space already mapped with a set of familiar topic feature vectors representing the set of familiar topics. For each current feature vector, a deviation distance in the feature space may be determined between the current feature vector and one or more familiar vectors. The greater the deviation distance between a current feature vector and a familiar topic feature vector in the feature space, the less similar the corresponding current data segment is to the corresponding familiar topic. A similarity score may be determined based on the inverse of the deviation distance such that the larger the deviation distance the smaller the similarity score.

In various embodiments, a new data segment may be identified as belonging to one of the familiar topics when the associated deviation distance is the smallest among all deviation distances between the current feature vector and the set of familiar topic feature vectors. Alternatively, the new data segment may be identified as belonging to one of the familiar topics when the associated similarity score is the largest among all similarity scores. In various examples, a deviation threshold may be placed such that a new data segment may be identified as belonging to one of the familiar topics when its deviation distance meets or falls below a deviation threshold. Alternatively, a similarity threshold may be placed such that a new data segment may be identified as belonging to one of the familiar topics when its associated similarity score meets or exceeds the similarity threshold. In various examples, a new data segment may be identified as an unfamiliar topic when all of the deviation distances are above the deviation threshold or when all of the similarity scores fall under the similarity threshold.

In various examples, embeddings and distance metrics, such as cosine similarity, may be used to identify topics as familiar or unfamiliar. As an example, a segment matching well with an established familiar topic would have a high cosine similarity score (e.g., closer to 1) whereas a segment matching poorly with an established familiar topic would have a low cosine similarity score (e.g., closer to 0). Further, an utterance "I ate noodles with sauce for dinner" would have a high similarity score with the established familiar topic label [Lasagna/Spaghetti/Tomato] but a low similarity score with the established familiar topic label [Smartphone/Tablet/Watch]. An utterance that does not fit in with any of the established topics will have low cosine similarity scores with all established familiar topics. A high similarity score indicates the utterance as being similar to a corresponding familiar topic and may be identified as belonging to the familiar topic. A low similarity score indicates that the utterance is dissimilar to a corresponding familiar topic.

Aspects of the present disclosure further include generating mention forecast(s) for one or more familiar topics. In various aspects, the generation of mention forecast(s) may be performed using one or more time-series prediction models. A time-series prediction model may be trained to generate a topic forecast based on the historical trend for the topic. The time-series prediction model may be a machine learning model. The prediction model may generate a range defined by an upper bound and a lower bound indicating the predicted quantity, rate, and/or acceleration of mentions for a familiar topic. Similarly, the prediction model may be a machine learning model. In examples, a prediction may be associated with a specific time period, such as for a specific time period within a day, or within a week. As an example, a predicted mention count for the same topic may be higher during the day than during the night, higher on the weekend than on weekdays. In some examples, when the actual quantity, rate, and/or acceleration of mention of a familiar topic deviate or diverge from the forecast, such as by crossing the higher bound or lower bound of the predicted range, an alert may be generated to indicate an abnormal event. Alternatively, a breach count threshold may be placed such that a single breach from the predicted range would not trigger an alert, but rather only after a breach count meets or exceeds the breach count threshold, the alert would be generated. In some examples, a breach level threshold may be defined such that a minor breach from the forecast would not trigger an alert or be counted as a breach, instead only when the breach meets or exceeds the breach level threshold from the forecast would an alert or breach count be triggered. While aspects of the present disclosure may be employed using one or more machine learning models, once of skill in the art will appreciate that various different types of machine learning models (e.g., linear regression models, deep learning models, transformer models, etc.) may be employed with aspects disclosed herein without departing from the scope of the present disclosure.

In various examples, the prediction of upper and lower bounds may be based on a detection sensitivity that may be pre-selected (e.g., by an administrator). As an example, the range defined by the upper and lower bounds may be wider when the sensitivity is lower such that it is more difficult for the actual quantity, rate, and/or acceleration of mentions to fall outside of the wide range. In contrast, the range defined by the upper and lower bounds may be narrower when the sensitivity is higher such that it is easier for the actual quantity, rate, and/or acceleration of mentions to fall outside of the narrow range, and thus triggering a detection of abnormality. The sensitivity may be represented by a sensitivity value, which may be associated with the size of the range. That is, a high sensitivity may be associated with a narrow predicted range and a small sensitivity value, whereas a low sensitivity may be associated with a wide predicted range and a high sensitivity value. Sensitivity may further be related to the breach count threshold and/or breach level threshold such that alerts may be triggered according to not only the size of the predicted range but the quantity of breaches and/or the severity of the breaches. Such tunable sensitivity may allow a customer to tailor the alert system to its needs. Further, sensitivity may be tuned automatically based on a pre-determined maximum alert count. For example, a baseline sensitivity value may be set as one which, based on historic averages, is expected to generate no more than 1 alert per day. The sensitivity may then be modified relative to the baseline sensitivity.

In various examples, time windows for mention forecast(s) may be tailored for a topic such that they may be kept at different time periods. Such granularity allows for longer time periods for less frequently mentioned familiar topics based on historic communication data, whereas shorter time periods may be used for more frequently mentioned familiar topics. In various examples, the longer time windows are used for forecasting when there is little data. The tallying system may exist at a different time window length to allow for early breach detection. In certain examples, a tallying system may be implemented to track 'up to the minute' quantities associated with a shorter window (e.g., 15 minutes) such that if the count exceeds a threshold within a shorter time than the window used for forecasting the mentions (e.g., 4 segments in the first 15 minute of a 60-minute window), a breach may be triggered right away rather than after the time window (e.g., 60 minutes) concludes.

In various examples, unfamiliar segments of communication data may be processed according to a clustering step (e.g., a secondary streaming clustering step) to determine when a new trend coalesces around one theme at a sufficient density. In some examples, the density of clusters of unfamiliar segments may be influenced by a time decay such that more recent communication data or segments are weighted more than older communication data or segments. The cluster of segments having similar themes may then be characterized by a single topic labeled with conceptually salient phrases. For example, term frequency-inverse document frequency may be used to determine said phrases. When a new topic is identified due to reaching a critical mass threshold, an alert may be generated and transmitted to indicate an emerging topic.

FIG. 1 illustrates a simplified view of an example system 100 for detecting emerging events according to aspects described herein. As illustrated, system 100 comprises communication monitoring system 102, agent device 104, caller device 106, and network 108. In various examples, communication monitoring system 102 and agent device 104 communicate via network 108. For example, network 108 may comprise a local area network, a wireless network, or the Internet, or any combination thereof, among other examples.

Communication monitoring system 102, agent device 104, and caller device 106 may be any of a variety of computing devices. For example, communication monitoring system 102, agent device 104, and/or caller device 106 may be a distributed computing device comprised of a set of computing devices that provide the functionality described herein. As another example, communication monitoring system 102, agent device 104, and caller device 106 may be a mobile computing device, a laptop computing device, a tablet computing device, and/or a desktop computing device, among other examples.

It will be appreciated that while system 100 is illustrated as comprising one communication monitoring system 102, three agent device 104, and one caller device 106, any number of such elements may be used in other examples. Further, the functionality described herein may be distributed among or otherwise implemented on any number of different computing devices in any of a variety of other configurations in other examples.

Communication monitoring system 102 is illustrated as comprising communication data store 110, data segmenter 112, familiar topic store 114, segment classifier 116, mention forecast engine 118, topic mention tracker 120, unfamiliar segment tracker 122, and alert engine 124. Communication monitoring system 102 may obtain communication data, segment data into segments, classify segment as familiar or unfamiliar, store familiar topics, generate mention forecasts, track mentions of familiar topics, track unfamiliar segments, and generate alerts.

Communication data store 110 may obtain and/or store communication data associated with communication between a plurality of sources, such as between agents and callers. An agent device may include a communication unit 126 and a data store 128. The communication unit 126 may enable an agent operating the agent device to communicate with a caller device 106, such as via a communication unit 130 of the caller device. Data store 128 of agent device 104 may store communication data at the agent device as text data, audio data, and/or video data. In certain examples, agent device 104 is configured to transcribe audio data (e.g., from phone calls) and/or video data (e.g., video conference call) into text data before storing the communication data at data store 128. In some examples, communication data stored at data store 128 may be transmitted to communication data store 110 on demand, on schedule, continuously, or in real-time or near real-time as new communication data are obtained. In some examples, current communication data associated with a recent time period may be obtained, and historic communication data from an earlier time period before the recent time period may also be obtained. Data store 128 at the agent device may be configured to store only recent communication data, such as by implementing an auto-delete function once communication data are transmitted to communication data store 110. Communication data store 110, in contrast, may store both historic and current communication data obtained from agent device 104.

Data segmenter 112 may segment the communication data obtained and stored at communication data store 110. For example, a set of current data segments may be generated based on current communication data, and a set of historic data segments may be generated based on historic communication data.

Familiar topic store 114 may obtain and store a set of familiar topics. For example, a set of familiar topics may be identified based on historic communication data. In various examples, once a set of unfamiliar segments forms a cluster (e.g., having feature vectors closely positioned) with a cluster size greater than a critical mass threshold, a familiar topic may be formed and associated with the corresponding cluster. In some examples, topic labels of the set of familiar topics may be stored. Familiar topic store 114 may be a distributed storage network configured to store familiar topic information distributedly across a set of nodes on a connected network. A topic may be labeled by a set of keywords that are conceptually salient but not textually similar to each other. Alternatively, or additionally, a topic may be labeled by one or more phrases. A communication segment may include a few sentences (e.g., sequential sentences), a sentence, or a partial sentence.

Segment classifier 116 may classify segments generated by data segmenter 112 as familiar or unfamiliar. For example, segment classifier 116 may classify a current data segment generated by data segmenter 112 based on current communication data obtained by communication data store. In various examples, segment classifier 116 may classify a current data segment by at least comparing the current data segment against the set of familiar topics stored at familiar topic store 114. In some examples, the comparison may be feature-space-based similarity comparison, such as by using method 300 of FIG. 3.

Figure 5:
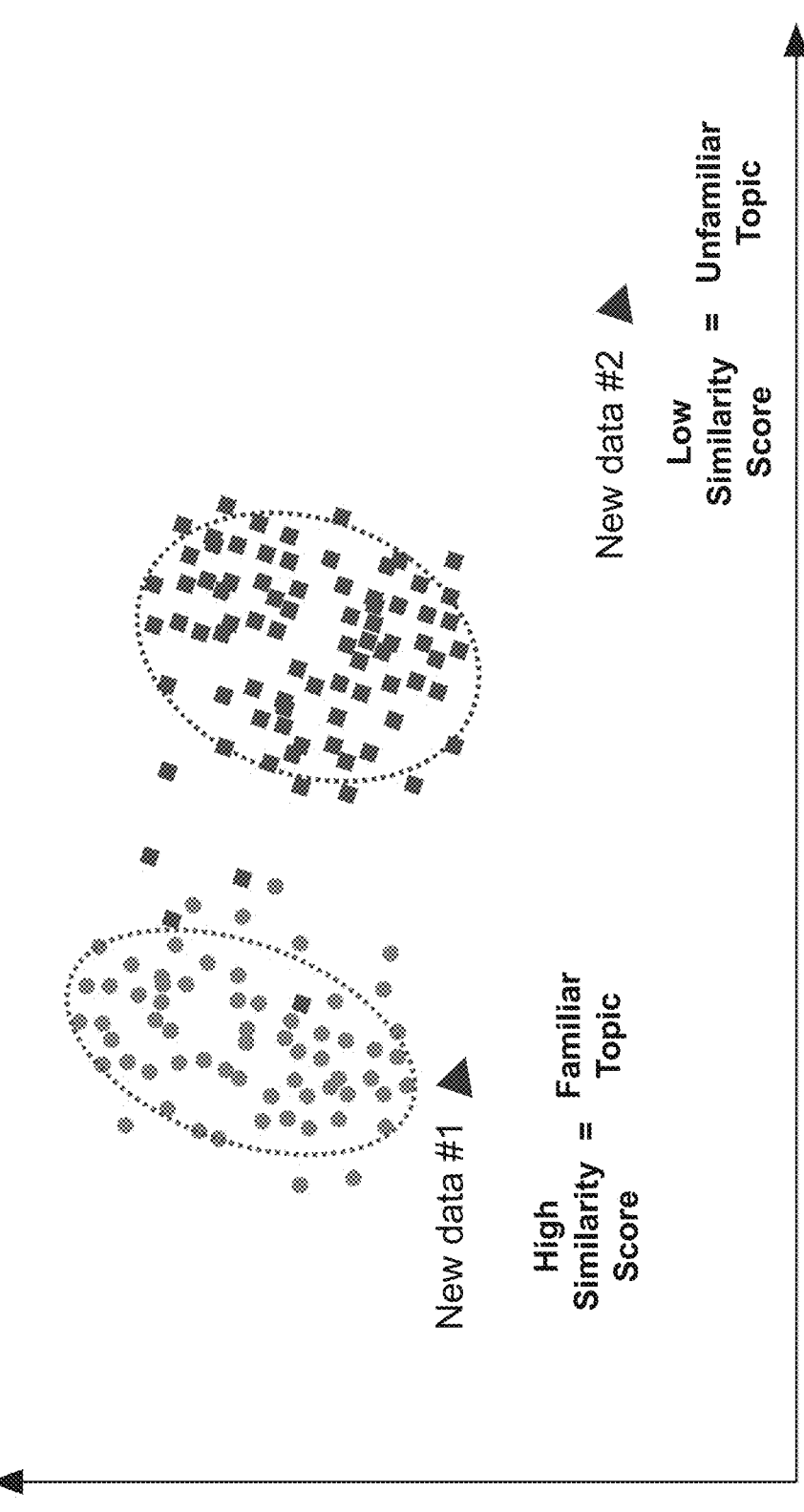
FIG. 5 illustrates an example graph associated with a feature space mapped with familiar topic feature vectors and new feature vectors.

In various examples, the comparison includes transforming data segments into feature vectors, mapping the feature vectors onto a feature space, and determining each segment as familiar or unfamiliar based on how close the segment-representing vectors are from each other. As an example, segment classifier 116 may first transform segments associated with the set of familiar topics stored at familiar topic store 114 into a set of familiar topic feature vectors, each representing a segment of a familiar topic. In some examples, a familiar topic feature vector may represent multiple communication segments belonging to a familiar topic. FIG. 5 shows a first subset of communication segments belonging to a first familiar topic, depicted by circles, and a second subset of communication segments belonging to a second familiar topic, depicted by squares. Each subset of communication segments may be represented by one feature vector, which may be near a central region occupied by the subset of communication segments. In other examples, the feature space with familiar topic feature vectors mapped thereto may be provided to segment classifier 116. In various examples, segment classifier 116 may transform a current segment into a current feature vector and map it to the feature space. FIG. 5 shows a first new data feature vector closely positioned with the feature vectors of the first topic, and a second new data feature vector positioned far from feature vectors of the first and second topics. In various examples, once the current feature vectors (e.g., representing current communication data segments) are mapped onto the feature space, segment classifier 116 may classify each current data segment as familiar or unfamiliar by determining a deviation distance between the current feature vector of the current data segment and the familiar topic feature vector of each familiar topic. The smaller the deviation distance (i.e., closer) between a current feature vector and a familiar topic feature vector, the more likely the current data segment belongs to the familiar topic. In contrast, the larger the deviation distance (i.e., farther) between a current feature vector and a familiar topic feature vector, the more likely the current data segment does not belong to the familiar topic. As examples, FIG. 5 depicts a first new data feature vector representing a first current data segment and a second new data feature vector representing a second current data segment. Segment classifier 116 is most likely to classify the current data segment as belonging to the first familiar topic because the first new data feature vector is spatially closest (e.g., smallest deviation distance) to the first subset of familiar topic feature vectors depicted by circles. In contrast, segment classifier 116 is most likely to classify the second current data segment as an unfamiliar segment (i.e., not belonging to existing familiar topics) because the second new data feature vector is spatially far away (e.g., large deviation distance) from both subgroups of familiar topic feature vectors.

In some examples, a deviation distance threshold may be used by segment classifier 116 to help with the classification. For example, a current data segment may be classified as belonging to a familiar topic when the deviation distance is smaller than or equal to the deviation distance threshold. Additionally, or alternatively, a current data segment may be classified as an unfamiliar segment when all deviation distances are larger than or equal to the deviation distance threshold. In various examples, deviation distances may be converted into similarity scores (e.g., with a value between 0 and 1). In some examples, a similarity score is at least proportional with the inverse of a deviation distance such that a larger deviation distance corresponds to a smaller similarity score, and a smaller deviation distance corresponds to a larger similarity score. In certain examples, a similarity score threshold may be used by segment classifier 116 to help with the classification. For example, a current data segment may be classified as belonging to a familiar topic when the similarity score is larger than or equal to the similarity score threshold. Additionally, or alternatively, a current data segment may be classified as an unfamiliar data segment when all similarity scores are smaller than or equal to the similarity score threshold.

Mention forecast engine 118 may predict, for one or more familiar topics, a predicted range of mention count, a predicted range of rate of mention, and/or a predicted range of acceleration of mention. In various examples, the prediction may be made using a time-series prediction model based on historic trends of mention extracted from historic communication data. A predicted range may include an upper threshold and/or a lower threshold. In various examples, mention forecast engine 118 may obtain a detection sensitivity, such as from an administrator of the communication monitoring system 102. Mention forecast engine 118 may predict the predicted range of mention count, the predicted range of rate of mention, and/or the predicted range of acceleration of mention, based at least in part on the detection sensitivity. For example, a predicted range may be wider when the detection sensitivity is lower, and the predicted range may be narrower when the detection sensitivity is higher. In certain examples, mention forecast engine 118 may set a breach count threshold (e.g., how many times may the actual breach count, rate, or acceleration falls outside of the forecast before an alert is generated), such as based on detection sensitivity. For example, the breach count threshold may be set higher when the detection sensitivity is low and lower when the detection sensitivity is high. In certain examples, mention forecast engine 118 may set a level of breach threshold (e.g., how far does the actual breach count, rate, or acceleration needs to fall outside of the forecast before being considered a breach towards the breach count), such as based on detection sensitivity. For example, the level of breach threshold may be set higher when the detection sensitivity is low and lower when the detection sensitivity is high. In certain examples, mention forecast engine 118 may set, for one or more unfamiliar topics, a critical count threshold, such as based on the detection sensitivity. For example, a critical count threshold may be set higher when the detection sensitivity is lower, and the critical count threshold may be set lower when the detection sensitivity is higher.

Topic mention tracker 120 may track or monitor, for each familiar topic, a mention count, a rate of mention, and/or an acceleration of mention. In some examples, tracking a mention count may include using a tallying mechanism such that every time the same topic is mentioned, the tally increases by one. In some examples, the rate of mention may be determined based on the tally count and a time segment of interest. In certain examples, the rate of mention is continuously updated during a time period of interest. For example, a rate of mention may first be set by a first mention count during a first time segment of the first time period, and the rate of mention may be repeatedly updated based on subsequent mention counts tallied in subsequent time segments of the first time period, such as until the end of the first time period. In some examples, the rate of mention is a rolling rate of mention where a subsequent time segment overlaps partially with the time segment before it. In other examples, the rate of mention is a non-rolling rate of mention where the subsequent time segment has no overlap with the time segment before it. In various examples, an acceleration of mention may be determined based on the rate of mention, such as by taking the derivative of the rate of mention. In various examples, topic mention tracker 120 may monitor when the count of mention, the rate of mention, and/or the acceleration of mention, for any familiar topic, falls outside of a corresponding predicted range. Such monitoring may be guided by a level of breach, such that minor deviation from the predicted range less than the level of breach would not constitute a breach towards the breach count.

Figure 6:
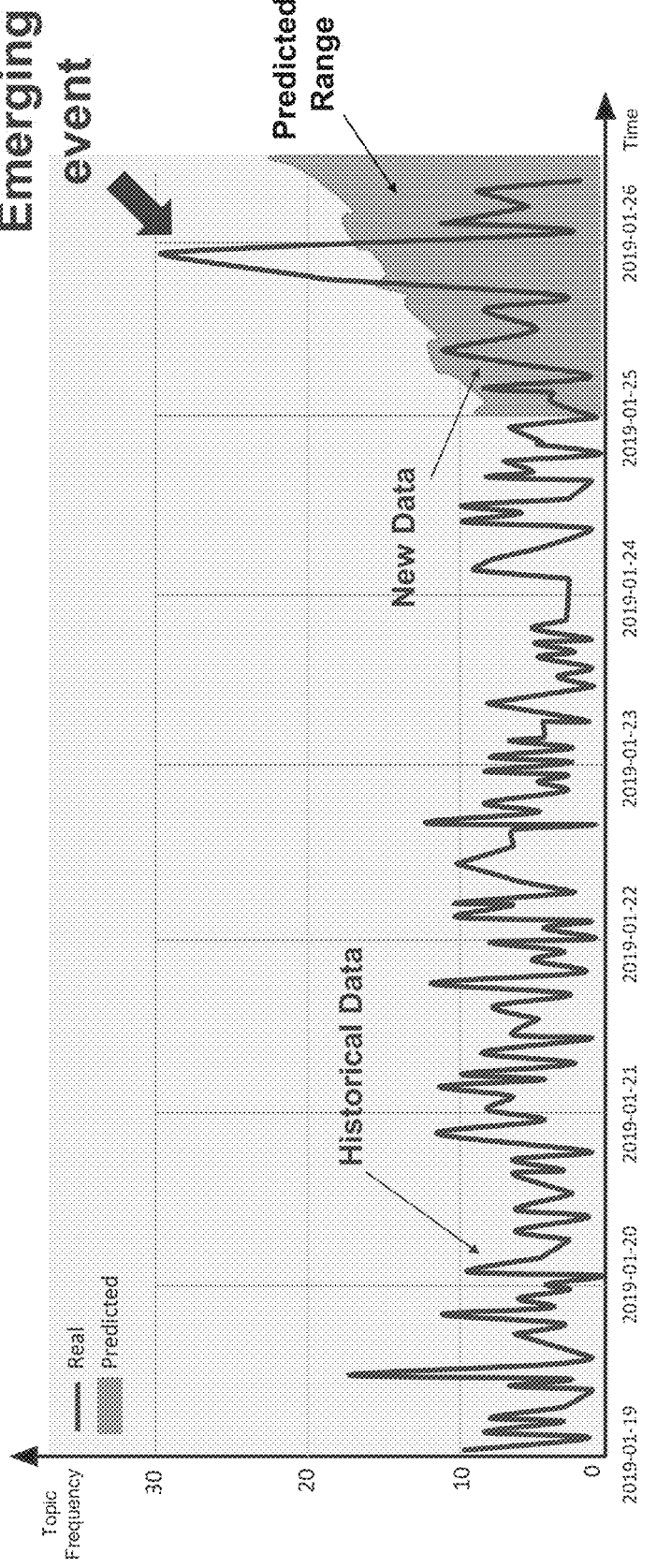
FIG. 6 illustrates an example graph associated with a topic mention trend.

In various examples, topic mention tracker 120 may, for one or more familiar topics: record a first rolling breach count associated with a number of instances its mention count meets or exceeds its associated predicted count range within a first rolling time window. In various examples, topic mention tracker 120 may, for one or more familiar topics: record a first rolling breach count associated with a number of instances its rate of mention meets or exceeds its associated predicted count range within a first rolling time window. In various examples, topic mention tracker 120 may, for one or more familiar topics: record a first rolling breach count associated with a number of instances its acceleration of mention meets or exceeds its associated predicted acceleration range within a first rolling time window. In some examples, topic mention tracker 120 may update the first rolling breach count when the first rolling time window moves forward. As an example, FIG. 6 depicts an example graph associated with a topic mention trend showing historic topic mentions, mention forecast represented by a predicted range, and recent topic mentions showing one breach event where rate of mention exceeds the predicted rate range.

In various embodiments, unfamiliar segment tracker 122 may track the data segments classified as belonging to none of the familiar topics and thus identified as unfamiliar data segments. Specifically, the unfamiliar data segments may be transformed into feature vectors and mapped onto a feature space. In various examples, a set of unfamiliar data segments that are spatially within a critical mass boundary in the feature space may be assigned to the same cluster of unfamiliar data segments. In some examples, unfamiliar segment tracker 122 may keep an unfamiliar segment count for each cluster. The data segments within the same cluster may be considered similar to each other and have potential to be related to the same topic. When a cluster meets or exceeds a critical mass threshold, a topic name (e.g., via TF-IDF) may be assigned to the cluster.

Figure 7:
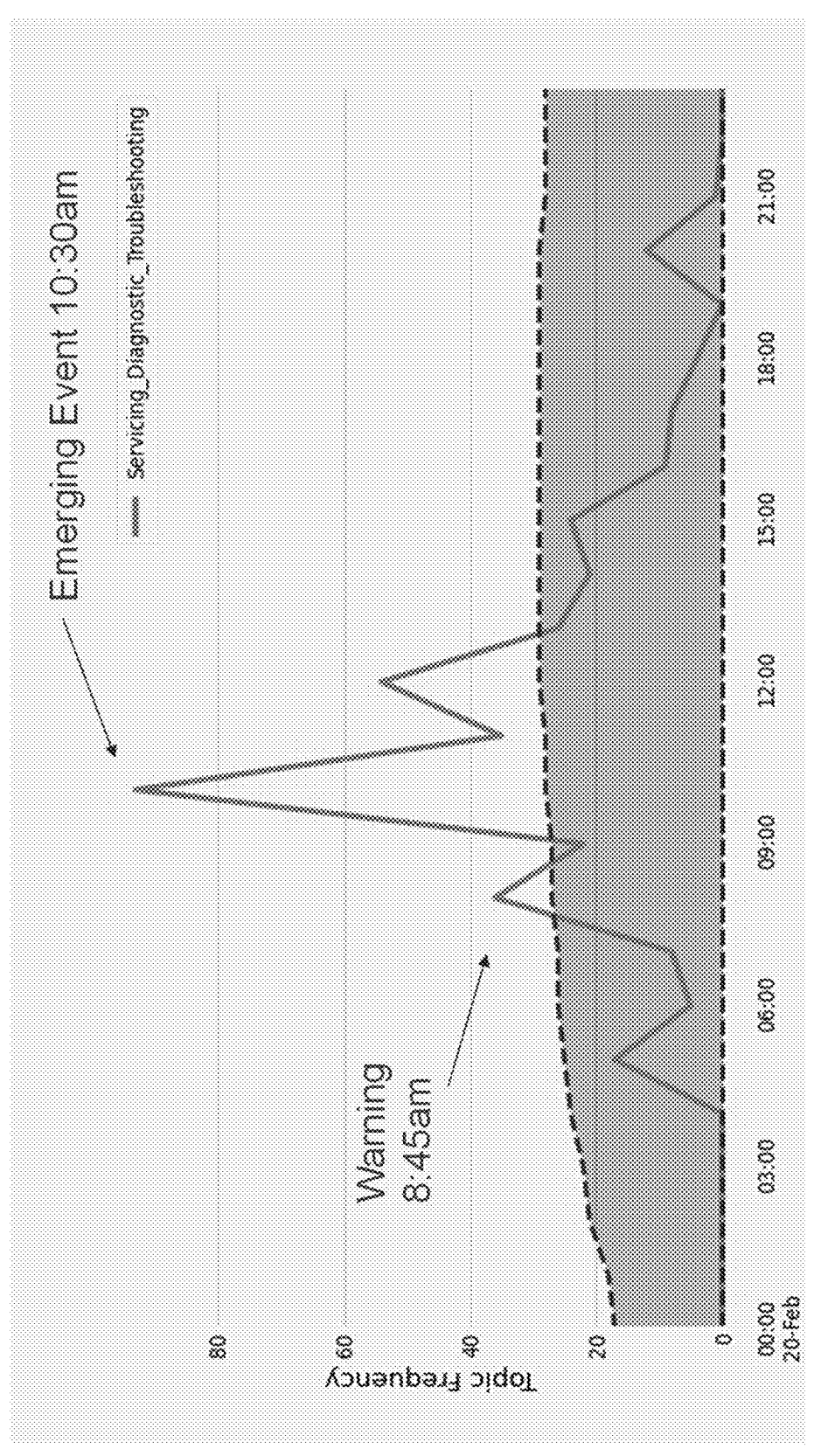
FIG. 7 illustrates an example graph associated with a topic mention breach.
Figure 8:
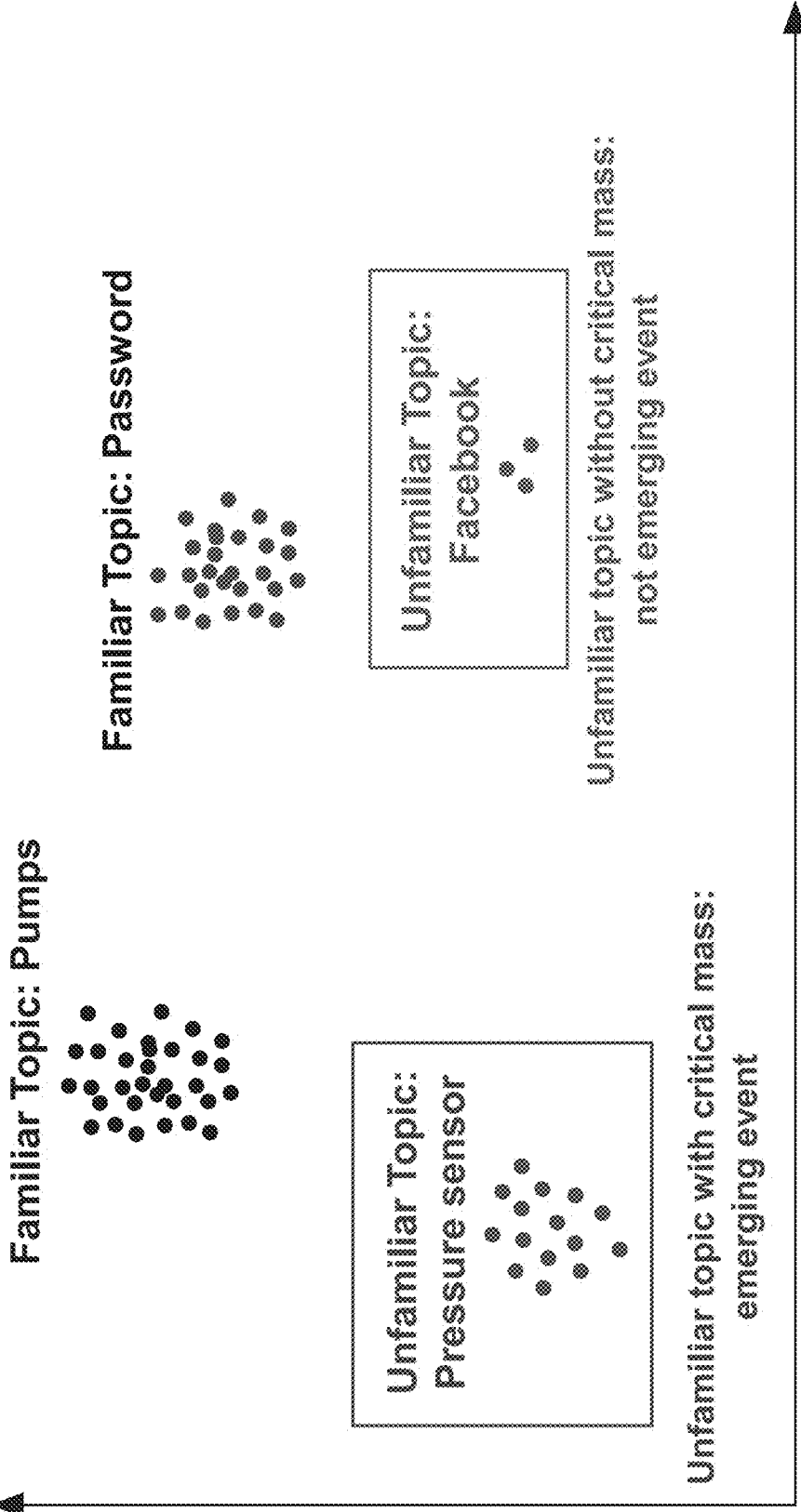
FIG. 8 illustrates an example graph associated with a feature space mapped with feature vectors of familiar and unfamiliar topics.

In various examples, alert engine 124 may generate alerts when a breach occurs and/or when breach count meets or exceeds a breach count threshold. In some examples, alert engine 124 may generate, for any familiar topic, a warning alert whenever a breach occurs (e.g., when an actual topic mention count, rate, or acceleration deviates from an associated forecast) and an abnormal rate emerging event alert when its breach count meets or exceeds the breach count threshold (see FIG. 7). In some examples, alert engine 124 may generate a new topic emerging event alert whenever critical mass is reached for any cluster of unfamiliar data segments (see FIG. 8). In some examples, alert engine 124 may include, as part of an alert, description of the topic showing abnormal trend or achieving critical mass, a set of representative communication data of the topic for review, and/or a mention trend including count, rate, and/or acceleration.

Figure 2:
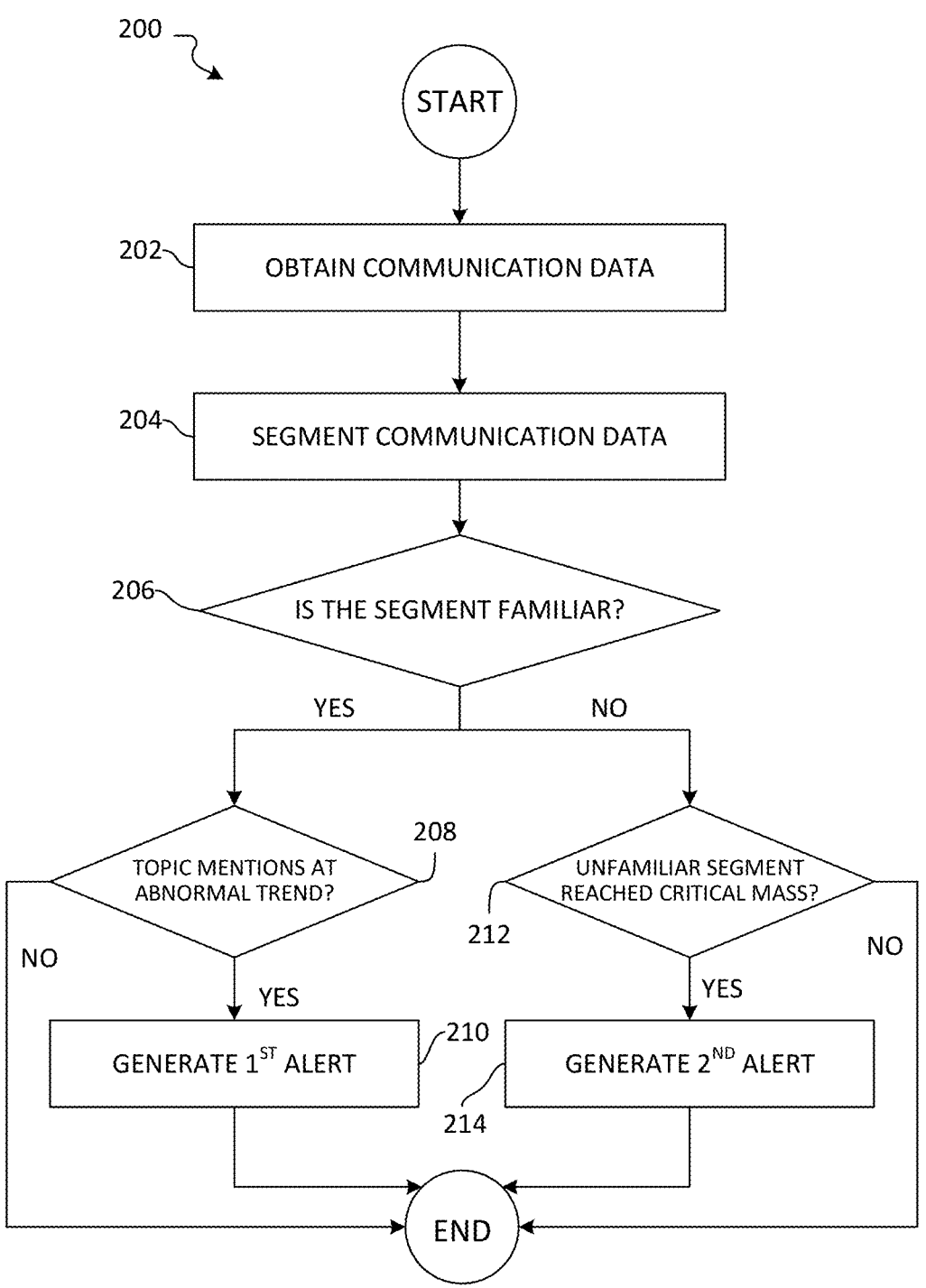
FIG. 2 illustrates a simplified view of an example method for detecting emerging events according to aspects described herein.

FIG. 2 illustrates a simplified view of an example method 200 for detecting emerging events according to aspects described herein. In various examples, aspects of method 200 are performed by a communication monitoring system, such as communication monitoring system 102 in FIG. 1.

Method 200 begins at operation 202, where communication data are obtained. For example, communication data may be obtained from agent devices (e.g., agent device 104). As discussed above, communication data obtained may include text data, transcribed audio data, and/or transcribed video data. Communication data may be obtained on demand, on schedule, continuously, or in real-time or near real-time as new data are captured by agent devices.

Flow next progresses to operation 204, where communication data are segmented. As discussed above, each communication segment may include two or more sentences (e.g., sequential sentences), a sentence, a partial sentence, or a word.

At determination 206, it is determined whether a data segment belongs to a familiar topic. As discussed above, the determination may include a literal comparison or semantic comparison based on topic labels, and/or a feature-space-based similarity comparison. See FIG. 3 for details of an example process associated with a feature-space-based similarity comparison.

If, at determination 206, it is determined that a data segment is classified as a familiar data segment, flow branches "YES" to determination 208, where it is determined whether topic mentions for the familiar topic have shown an abnormal trend. Specifically, at determination 208, it is determined whether the count, rate, and/or acceleration of the topic mentions for the familiar topic have deviated from corresponding mention forecasts. Forecasts may include, a count range, a rate range, and/or an acceleration range, a breach count threshold, and/or a breach level threshold.

If, at determination 208, it is determined that the topic mentions for the familiar topic have shown an abnormal trend, flow branches "YES" to operation 210, where a first alert is generated. The first alert may be indicative of a familiar-topic-related emerging event. In some examples, the first alert may include or be accompanied with description of the familiar topic showing abnormal trend, a set of representative communication data of the familiar topic for review, and/or a mention trend including count, rate, and/or acceleration.

If, however, it is instead determined at determination 208, that the topic mentions for the familiar topic have not shown an abnormal trend, flow branches "NO" to terminate method 200.

If, however, it is instead determined at determination 206, that a data segment is classified as unfamiliar, flow branches "NO" to determination 212, where it is determined whether a cluster count of a cluster of unfamiliar data segments has reached critical mass. Specifically, at determination 212, it is determined whether a set of unfamiliar data segments belonging to none of the familiar topics yet similar to each other (e.g., in a feature space) have an associated unfamiliar segment count meeting or exceeding a critical mass threshold.

If, at determination 212, it is determined that a cluster of unfamiliar data segments have reached critical mass, flow branches "YES" to operation 214, where a second alert is generated. The second alert may be indicative of a new-topic-related emerging event. In some examples, the second alert may include or be accompanied with description of the new topic that meets or exceeds critical mass, a set of representative communication data of the new topic for review, and/or a mention trend including cluster count.

If, however, it is instead determined at determination 212, that none of the unfamiliar data segments have reached critical mass, flow branches "NO" to terminate method 200.

Figure 3:
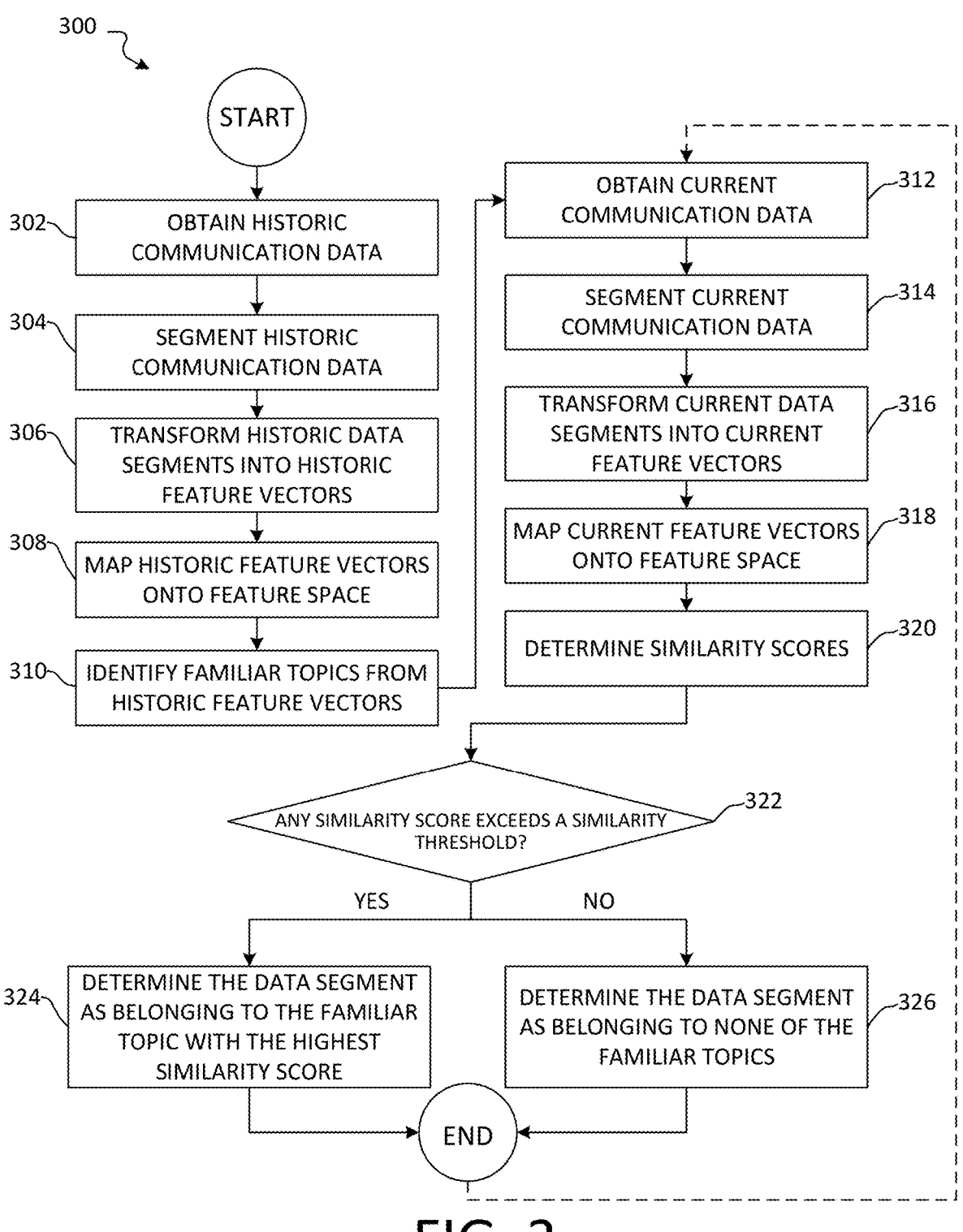
FIG. 3 illustrates a simplified view of an example method for classifying a data segment as familiar or unfamiliar according to aspects described herein.

FIG. 3 illustrates a simplified view of an example method 300 for classifying a data segment as familiar or unfamiliar according to aspects described herein. In various examples, aspects of method 300 are performed by a communication monitoring system, such as communication monitoring system 102 in FIG. 1.

Method 300 begins at operation 302, where historic communication data are obtained. For example, historic communication data may be obtained from agent devices (e.g., agent device 104). As discussed above, communication data obtained may include text data, transcribed audio data, and/or transcribed video data. Communication data may be obtained on demand, on schedule, continuously, or in real-time or near real-time as new data are captured by agent devices.

Flow next progresses to operation 304, where historic communication data are segmented. As discussed above, a communication data segment may include two or more sentences (e.g., sequential sentences), a sentence, a partial sentence, or a word.

Flow next progresses to operation 306, where historic data segments are transformed into familiar topic feature vectors. Specifically, each historic data segment may be represented by a familiar topic feature vector.

Flow next progresses to operation 308, where familiar topic feature vectors are mapped onto a feature space. Here, a familiar topic may be represented in the feature space by a single corresponding familiar topic feature vector.

Flow next progresses to operation 310, where familiar topics are identified from the familiar topic feature vectors in the feature space. As discussed above, one or more feature clusters may be identified from the familiar topic feature vectors, within each cluster the feature vectors being closely related (e.g., positioned closely within the feature space). For each cluster, a familiar topic may be identified and associated with the cluster. The familiar topic may further be labeled by a set of keywords that are conceptually salient but not textually similar to each other.

Flow next progresses to operation 312, where current communication data are obtained. Similar to the historic communication data, current communication data may be obtained from agent devices (e.g., agent device 104), at a time period later than the historic communication data. As discussed above, communication data obtained may include text data, transcribed audio data, and/or transcribed video data. Communication data may be obtained on demand, on schedule, continuously, or in real-time or near real-time as new data are captured by agent devices. In various examples, operations 302 to 308 occur once whereas operations 312 to 324 (or 326) may form a loop and be repeated.

Flow next progresses to operation 314, where current communication data are segmented. As discussed above, a communication data segment may include two or more sentences (e.g., sequential sentences), a sentence, a partial sentence, or a word.

Flow next progresses to operation 316, where current data segments are transformed into current feature vectors. Specifically, each current data segment may be represented by a current feature vector.

Flow next progresses to operation 318, where current feature vectors are mapped onto a feature space. Here, each current data segment is represented by a current feature vector in the feature space, which is already mapped with a set of familiar topic feature vectors representing a set of identified familiar topics.

Flow next progresses to operation 320, where similarity scores are determined. In various examples, deviation distances between feature vectors in the feature space may first be determined. Specifically, for a current feature vector, a deviation distance in the feature space may be determined between the current feature vector and one or more familiar vectors. A similarity score may next be determined based on the inverse of the deviation distance.

At determination 322, it is determined whether any similarity score meet or exceed a similarity score threshold. Specifically, a similarity score associated with a familiar topic feature vector-current feature vector pair is compared against the similarity score threshold.

If, at determination 322, it is determined that at least one similarity score meets or exceeds the similarity score threshold, flow branches "YES" to determination 324, where the current data segment is determined as belonging to the familiar topic with the highest similarity score.

If, at determination 322, it is determined that none of the similarity scores meet or exceed the similarity score threshold, flow branches "NO" to determination 326, where current data segment is determined to be an unfamiliar data segment (e.g., belonging to none of the familiar topics).

Figure 4:
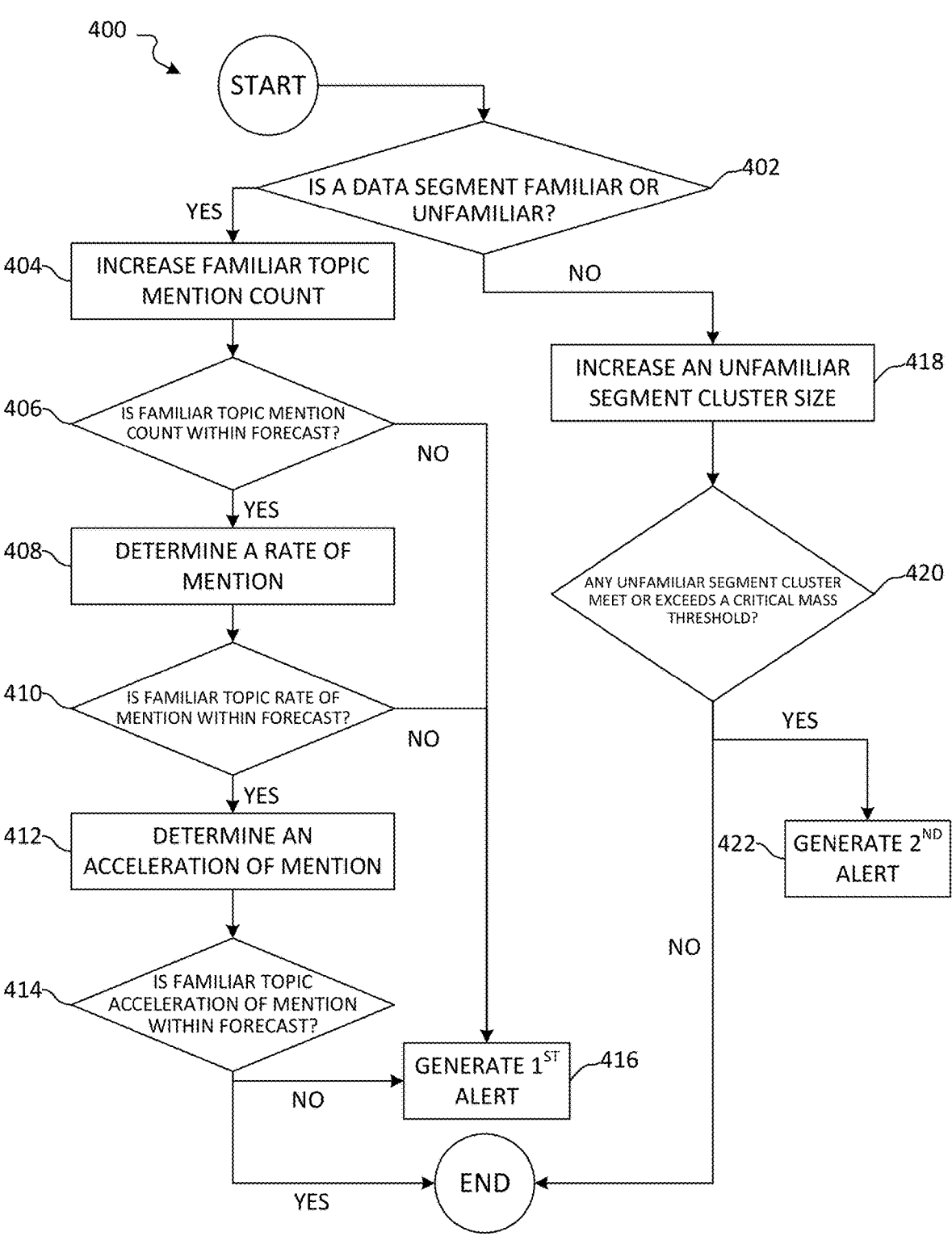
FIG. 4 illustrates a simplified view of an example method for generating alerts based on topic mentions according to aspects described herein.

FIG. 4 illustrates a simplified view of an example method 400 for generating alerts based on topic mentions according to aspects described herein. In various examples, aspects of method 400 are performed by a communication monitoring system, such as communication monitoring system 102 in FIG. 1.

Method 400 begins at determination 402, where it is determined whether a communication data segment is familiar or unfamiliar. Details of such segment classification may be similarly performed based on method 300 in FIG. 3. For example, determining whether a data segment is familiar or unfamiliar may involve obtain historic communication data, segmenting historic communication data, transforming historic data segments into familiar topic feature vectors, mapping familiar topic feature vectors onto a feature space, obtaining current communication data, segmenting current communication data, transforming current data segments into current feature vectors, mapping current feature vectors onto the feature space, determining similarity scores based on deviation distances between the current feature vectors and familiar topic feature vectors in the feature space, and determining whether any similarity score exceeds a similarity threshold, and either determine the data segment as belonging to the familiar topic with the highest similarity score or determine the data segment as an unfamiliar data segment (i.e., belonging to none of the familiar topics).

If, at determination 402, it is determined that the data segment is classified as familiar, flow branches "YES" to operation 404, where a corresponding familiar topic mention count increases. As discussed above, a tallying system may be implemented for each familiar topic such that when it is mentioned in the communication data, its tally increases by one. In certain examples, the tally system may be implemented according to a time window that may be rolling or non-rolling, such that mentions outside of the time window are not included in the mention count. It is to be appreciated that other methods of keeping track of a mention count may be implemented as well.

Flow next progresses to determination 406, where it is determined whether the corresponding topic mention count is still within a count forecast. As discussed above, a count forecast may be predicted for each topic and the count forecast may include a count range including an upper count range and a lower count range. The mention count may then be compared to the count forecast to determine whether the mention count has fallen below or met the lower count threshold, or whether the mention count has met or exceeded the upper count threshold. In some examples, a breach count threshold and/or a breach level threshold may be implemented to guide the determination. For example, for method to flow to operation 416 from determination 406, each breach must be as severe as or more severe than the breach level threshold and the breach count must meet or exceed the breach count threshold.

If, at determination 406, it is determined that the corresponding topic mention count is still within the count forecast, flow branches "YES" to operation 408, where a corresponding familiar topic rate of mention is determined. As discussed above, a rate of mention may be determined based on the topic mention count and a time window of interest. The time window may be a rolling time window that may exclude mentions outside of the time window when determining the rate.

Flow next progresses to determination 410, where it is determined whether the corresponding topic mention rate of mention is still within a rate forecast. As discussed above, a rate forecast may be predicted for each topic and the rate forecast may include a rate range including an upper rate range and a lower rate range. The rate of mention may then be compared to the rate forecast to determine whether the rate of mention has fallen below or met the lower rate threshold, or whether the rate of mention has met or exceeded the upper rate threshold. In some examples, a breach count threshold and/or a breach level threshold may be implemented to guide the determination. For example, for method to flow to operation 416 from determination 410, each breach must be as severe as or more severe than the breach level threshold and the breach count must meet or exceed the breach count threshold.

If, at determination 410, it is determined that the corresponding topic rate of mention is still within the rate forecast, flow branches "YES" to operation 412, where a corresponding familiar topic acceleration of mention is determined. As discussed above, an acceleration of mention may be determined based on the derivative of the rate of mention (i.e., to show acceleration or deceleration of growth in topic mention).

Flow next progresses to determination 414, where it is determined whether the corresponding topic mention acceleration of mention is still within an acceleration forecast. As discussed above, an acceleration forecast may be predicted for each topic and the acceleration forecast may include an acceleration range including an upper acceleration range and a lower acceleration range. The acceleration of mention may then be compared to the acceleration forecast to determine whether the acceleration of mention has fallen below or met the lower acceleration threshold, or whether the acceleration of mention has met or exceeded the upper acceleration threshold. In some examples, a breach count threshold and/or a breach level threshold may be implemented to guide the determination. For example, for method to flow to operation 416 from determination 414, each breach must be as severe as or more severe than the breach level threshold and the breach count must meet or exceed the breach count threshold.

If, at determination 414, it is determined that the corresponding topic acceleration of mention is still within the acceleration forecast, flow branches "YES" to terminate method 400.

If, however, it is instead determined at determination 414, that the corresponding topic acceleration of mention is no longer within the acceleration forecast, flow branches "NO" to operation 416, where a first alert is generated. As discussed above, the first alert may be indicative of a familiar-topic-related emerging event, such as an abnormal topic mention count, rate, and/or acceleration. In various examples, the first alert may include or be accompanied with description of the familiar topic showing the abnormal trend, a set of representative communication data of the familiar topic for review, and/or a mention trend including count, rate, and/or acceleration.

If, however, it is instead determined at determination 410, that the corresponding topic rate of mention is no longer within the rate forecast, flow branches "NO" to operation 416, where a first alert is generated. As discussed above, the first alert may be indicative of a familiar-topic-related emerging event, such as an abnormal topic mention count, rate, and/or acceleration. In various examples, the first alert may include or be accompanied with description of the familiar topic showing the abnormal trend, a set of representative communication data of the familiar topic for review, and/or a mention trend including count, rate, and/or acceleration.

If, however, it is instead determined at determination 406, that the corresponding topic mention count is no longer within the count forecast, flow branches "NO" to operation 416, where a first alert is generated. As discussed above, the first alert may be indicative of a familiar-topic-related emerging event, such as an abnormal topic mention count, rate, and/or acceleration. In various examples, the first alert may include or be accompanied with description of the familiar topic showing the abnormal trend, a set of representative communication data of the familiar topic for review, and/or a mention trend including count, rate, and/or acceleration.

If, at determination 402, it is determined that the data segment is classified as unfamiliar, flow branches "NO" to operation 418, where a corresponding unfamiliar segment cluster size is increased. As discussed above, each unfamiliar data segment (i.e., determined as belonging to none of the familiar topics) may be represented as a new feature vector in the feature space. When multiple new feature vectors of multiple unfamiliar data segments clusters together in the feature space (e.g., closely located in the feature space), a segment cluster size may represent the quantity of segments within the cluster.

Flow next progresses to determination 420, where it is determined whether any unfamiliar segment cluster has met or exceeded a critical mass threshold.

If, at determination 420, it is determined that an unfamiliar segment cluster has met or exceeded a critical mass threshold, flow branches "YES" to operation 422, where a second alert is generated. As discussed above, the second alert may be indicative of a new-topic-related emerging event, such as a critical mass topic mention count, rate, and/or acceleration. In various examples, the second alert may include or be accompanied with description of the new topic showing the mention trend, a set of representative communication data of the new topic for review, and/or a mention trend including count, rate, and/or acceleration.

If, however, it is instead determined at determination 420, that none of the unfamiliar segment clusters has met or exceeded a critical mass threshold, flow branches "NO" to end method 400.

It is to be understood that although the operations and determinations of method 400 have been shown according to FIG. 4, there can be many alternatives, modifications, and variations. For example, some of the operations and determinations may be expanded and/or combined. Other operations and determinations may be inserted to those noted above. Depending upon the embodiment, the sequence of operations may be interchanged with others replaced. As an example, determination 410 may be performed prior to determination 406 and/or 414. As another example, determination 414 may be performed prior to determinations 406 and/or 410.

Figure 9:
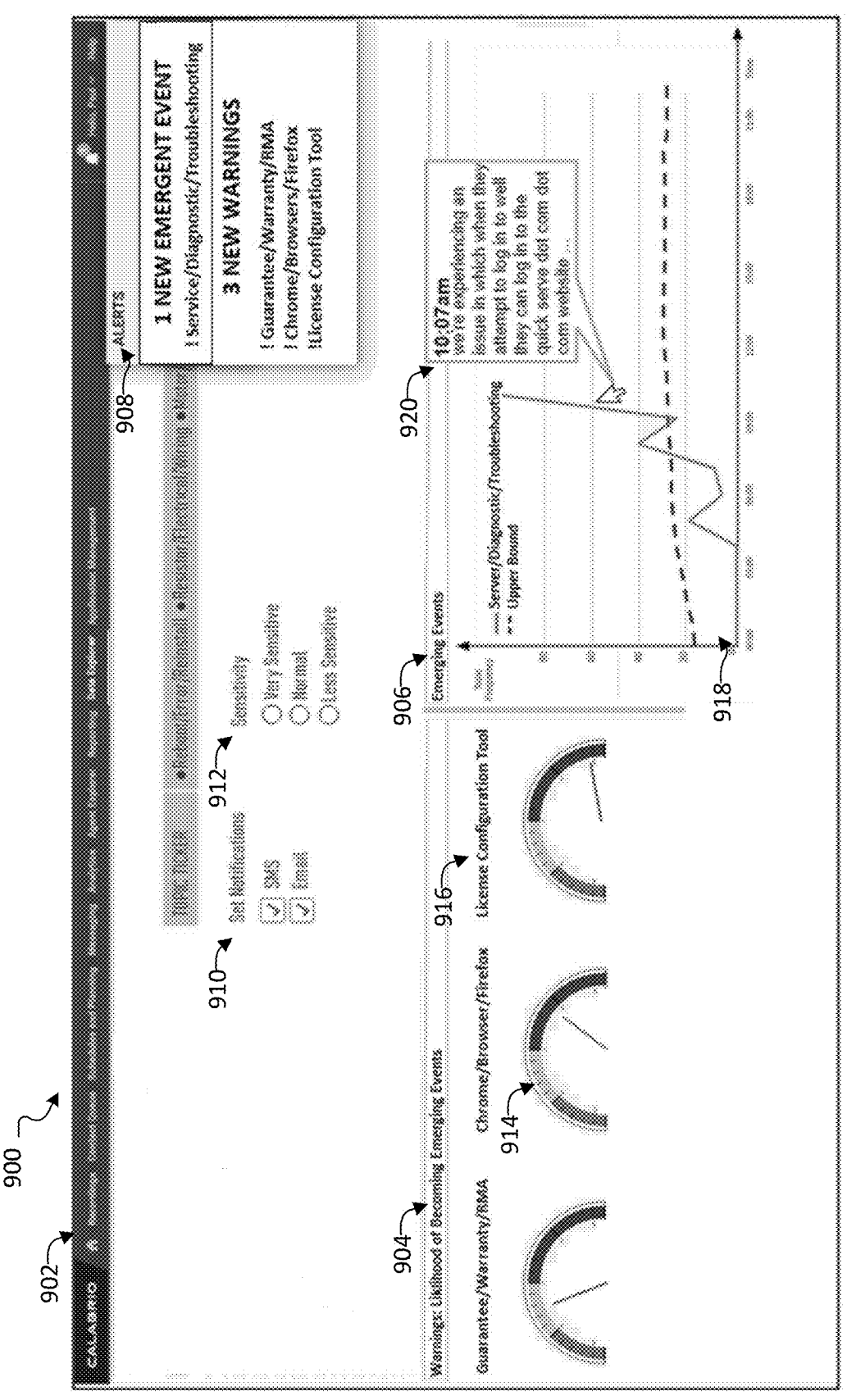
FIG. 9 illustrates a simplified view of an example user interface for emerging event detection system according to aspects described herein.

FIG. 9 illustrates a simplified view of an example user interface 900 for emerging event detection system according to aspects described herein. Such user interface aspects may be generated by a computing device. As illustrated, user interface 900 comprises function bar 902, warning section 904, new event section 906, and alerts section 908. User interface 900 may be provided to a recipient of emerging event alerts generated by systems and methods of the present disclosure. As shown, warning section 904 may depict multiple potential topics that are being monitored including topic mentions meeting or exceeding warning thresholds but not yet to new emerging event thresholds. As depicted, new event section 906 shows a mention trend graphic 918 including topic mentions breaching the associated mention forecast, enough to constitute a new emerging event alert. Further, a sample communication segment 920 associated with the breach is also shown. Alerts section summarizes the likely emerging events of warning section 904 and new emerging event of new event section 906. As shown, user interface 900 further includes notifications section 910 for selection method of communication and detection sensitivity section 912 for determining system's sensitivity to topic mention breach.

Figure 10:
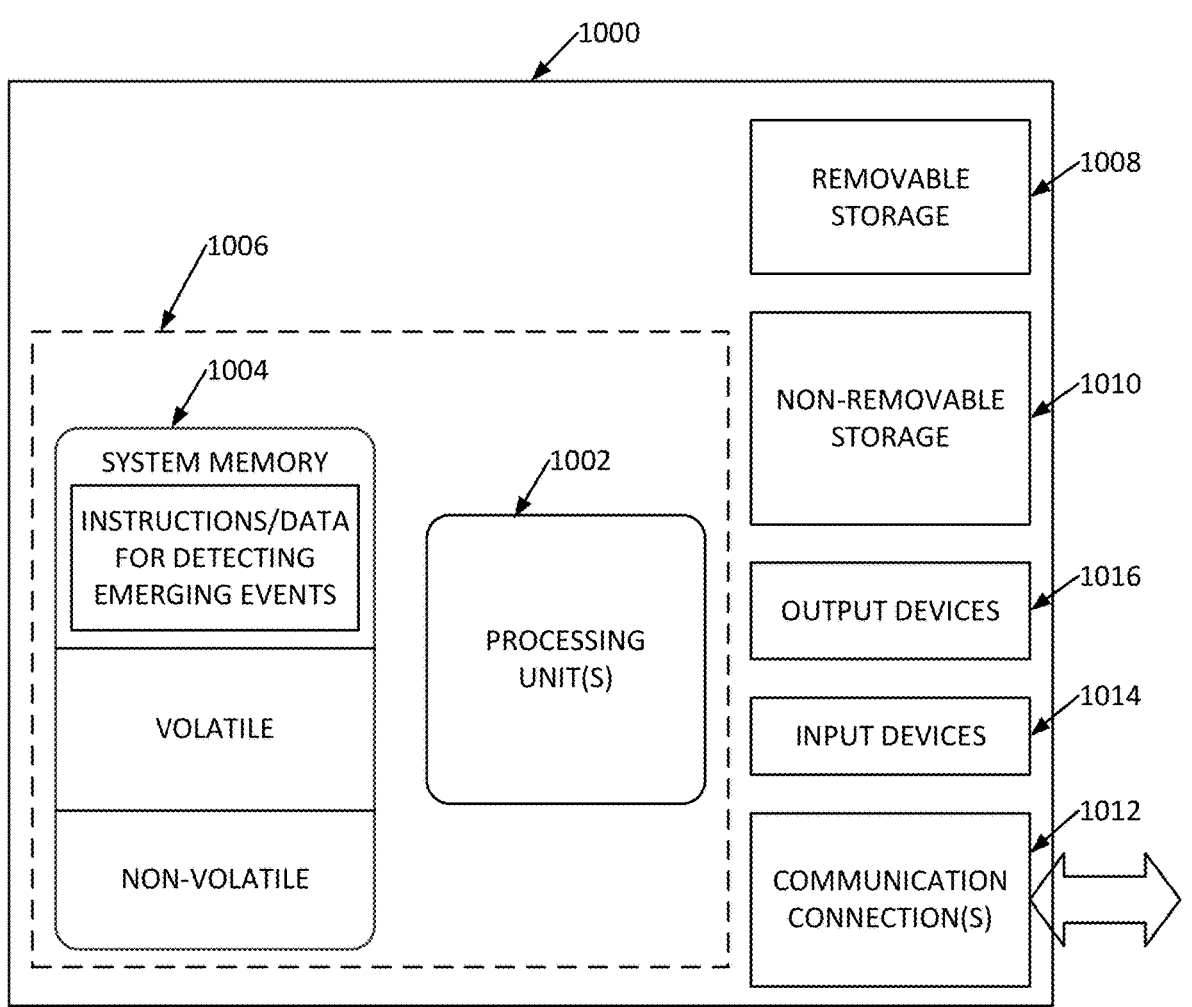
FIG. 10 illustrates a simplified view of an example operating environment in which one or more aspects of the present application may be implemented.

FIG. 10 illustrates a simplified view of an example operating environment 1000 in which one or more of the present embodiments may be implemented. This is only one example of a suitable operating environment and is not intended to suggest any limitation as to the scope of use or functionality. Other well-known computing systems, environments, and/or configurations that may be suitable for use include, but are not limited to, personal computers, server computers, hand-held or laptop devices, multiprocessor systems, microprocessor-based systems, programmable consumer electronics such as smart phones, network PCs, minicomputers, mainframe computers, distributed computing environments that include any of the above systems or devices, and the like.

In its most simplified configuration, operating environment 1000 typically may include at least one processing unit 1002 and memory 1004. Depending on the exact configuration and type of computing device, memory 1004 (storing, among other things, APIs, programs, etc. and/or other components or instructions to implement or perform the system and methods disclosed herein, etc.) may be volatile (such as RAM), non-volatile (such as ROM, flash memory, etc.), or some combination of the two. This most simplified configuration is illustrated in FIG. 10 by dashed line 1006. Further, environment 1000 may also include storage devices (removable, 1008, and/or non-removable, 1010) including, but not limited to, magnetic or optical disks or tape. Similarly, environment 1000 may also have input device(s) 1014 such as a keyboard, mouse, pen, voice input, etc. and/or output device(s) 1016 such as a display, speakers, printer, etc. Also included in the environment may be one or more communication connections, 1012, such as LAN, WAN, point to point, etc.

Operating environment 1000 may include at least some form of computer readable media. The computer readable media may be any available media that can be accessed by processing unit 1002 or other devices comprising the operating environment. For example, the computer readable media may include computer storage media and communication media. The computer storage media may include volatile and nonvolatile, removable, and non-removable media implemented in any method or technology for storage of information such as computer readable instructions, data structures, program modules or other data. The computer storage media may include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium, which can be used to store the desired information. The computer storage media may not include communication media.

The communication media may embody computer readable instructions, data structures, program modules, or other data in a modulated data signal such as a carrier wave or other transport mechanism and includes any information delivery media. The term "modulated data signal" may mean a signal that has one or more of its characteristics set or changed in such a manner as to encode information in the signal. For example, the communication media may include a wired media such as a wired network or direct-wired connection, and wireless media such as acoustic, RF, infrared and other wireless media. Combinations of the any of the above should also be included within the scope of computer readable media.

The operating environment 1000 may be a single computer operating in a networked environment using logical connections to one or more remote computers. The remote computer may be a personal computer, a server, a router, a network PC, a peer device, or other common network node, and typically includes many or all of the elements described above as well as others not so mentioned. The logical connections may include any method supported by available communications media. Such networking environments are commonplace in offices, enterprise-wide computer networks, intranets, and the Internet.

The different aspects described herein may be employed using software, hardware, or a combination of software and hardware to implement and perform the systems and methods disclosed herein. Although specific devices have been recited throughout the disclosure as performing specific functions, one skilled in the art will appreciate that these devices are provided for illustrative purposes, and other devices may be employed to perform the functionality disclosed herein without departing from the scope of the disclosure.

As stated above, a number of program modules and data files may be stored in the system memory 1004. While executing on the processing unit 1002, program modules (e.g., applications, Input/Output (I/O) management, and other utilities) may perform processes including, but not limited to, one or more of the stages of the operational methods described herein such as the methods illustrated in FIG. 2, 3, or 4, for example.

Furthermore, examples of the disclosure may be practiced in an electrical circuit comprising discrete electronic elements, packaged or integrated electronic chips containing logic gates, a circuit utilizing a microprocessor, or on a single chip containing electronic elements or microprocessors. For example, examples of the disclosure may be practiced via a system-on-a-chip (SOC) where each or many of the components illustrated in FIG. 10 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality described herein may be operated via application-specific logic integrated with other components of the operating environment 1000 on the single integrated circuit (chip). Examples of the present disclosure may also be practiced using other technologies capable of performing logical operations such as, for example, AND, OR, and NOT, including but not limited to mechanical, optical, fluidic, and quantum technologies. In addition, examples of the disclosure may be practiced within a general-purpose computer or in any other circuits or systems.

As will be understood from the foregoing disclosure, one aspect of the technology relates to a computer-implemented method for detecting emerging events. The method comprises: obtaining current communication data associated with communication between a first plurality of sources during a first time period; segmenting the current communication data into a set of data segments; and determining, for a data segment, whether the data segment belongs to a familiar topic of a set of familiar topics. In various examples, the method further comprises, when the data segment is determined to be belonging to a familiar topic: determining a mention metric of the familiar topic during the first time period; determining whether the mention metric falls outside of an associated metric range for more than an associated breach threshold; and generating, upon determining its mention metric falls outside of its associated metric range more than its associated breach threshold, a first notification indicative of a familiar-topic-related emerging event. Additionally or alternatively, the method further comprises, when the data segment is determined to be belonging to none of the set of familiar topics: determining an unfamiliar segment count for a set of unfamiliar data segments determined as not belonging to a familiar topic, the set of unfamiliar data segments being similar to each other; determining whether its unfamiliar segment count meets or exceeds a critical mass threshold; and generating, upon determining its unfamiliar segment count meets or exceeds the critical mass threshold, a second notification indicative of a new-topic-related emerging event. In an example, the method further comprises: obtaining historic communication data associated with communication between a second plurality of sources during a second time period prior to the first time period; and identifying the set of familiar topics based at least in part upon the historic communication data. In another example, the current communication data are time-stamped and include text communication data or transcribed audio communication data between the plurality of sources. In yet another example, one or more familiar topics of the set of familiar topics is labeled by a set of keywords that are conceptually salient but not textually similar to each other. In still another example, the one or more communication segments comprise one or more sequential sentences or a partial sentence. In another example, determining whether the data segment belongs to a familiar topic of a set of familiar topics comprises: transforming the data segment into a current feature vector; mapping the current feature vector onto a feature space, the feature space mapped with a set of familiar topic feature vectors associated with the set of familiar topics; for each familiar topic feature vector: determining a deviation distance between the current feature vector to the familiar topic feature vector; and determining a similarity score indicative of how similar the current feature vector is to an associated familiar topic; and determining a highest similarity score that exceeds a similarity score threshold, identifying the data segment as belonging to the familiar topic associated with the highest similarity score; or upon determining no similarity score exceeds the similarity score threshold, identifying the data segment as belonging to none of the set of familiar topics. In yet another example, the set of unfamiliar data segments are spatially within a critical mass boundary in the feature space. In a further example, the method further comprises transforming the set of familiar topics into the set of familiar topic feature vectors; and mapping the set of familiar topic feature vectors onto the feature space. In still another example, determining a mention metric further comprises: determining a rate of mention as the mention metric based at least in part upon a first mention count during a first time segment of the first time period; and repeatedly updating the rate of mention based at least in part upon an immediate subsequent mention count during an immediate subsequent time segment of the first time period until the end of the first time period. In a further example, the rate of mention is a rolling rate of mention where a subsequent time segment overlaps partially with the time segment before it; or the rate of mention is a non-rolling rate of mention where the subsequent time segment has no overlap with the time segment before it. In another example, the method further comprises: obtaining historic communication data associated with communication between a second plurality of sources during a second time period prior to the first time period; identifying the set of familiar topics based at least in part upon the historic communication data using the topic identification model; and predicting, for one or more familiar topics in the set of familiar topics, a rate range as the metric range based at least in part upon the historic communication data using a time-series prediction model; wherein the rate range includes a lower rate threshold and a higher rate threshold. In a further example, the method further comprises: obtaining a detection sensitivity; wherein predicting the rate range is further based upon the detection sensitivity such that the rate range is wider when the detection sensitivity is lower and the rate range is narrower when the detection sensitivity is higher. In still another example, the method further comprises: obtaining a detection sensitivity; and determining, for one or more familiar topics, a count threshold as part of the breach threshold based upon the detection sensitivity such that the count threshold is higher when the detection sensitivity is lower and the count threshold is lower when the detection sensitivity is higher. In yet another example, the method further comprises: obtaining a detection sensitivity; and determining, for one or more familiar topics, a level threshold as part of the breach threshold based upon the detection sensitivity such that the level threshold is higher when the detection sensitivity is lower and the level threshold is lower when the detection sensitivity is higher. In still another example, the method further comprises: for one or more familiar topics: recording a rolling breach count associated with a number of instances its mention metric meets or exceeds its associated metric range within a rolling time window; and updating the rolling breach count when the rolling time window moves forward. In yet another example, the method further comprises: transmitting the first notification or the second notification to a recipient; wherein the first notification and the second notification comprise a description of the topic, a set of representative communication data available for review, and a mention trend. In a further example, the method further comprises: when the data segment is determined to be belonging to a familiar topic: generating, upon determining its mention metric falls outside of its associated metric range, a third notification indicative of a potential familiar-topic-related emerging event; or when the data segment is determined to be belonging to none of the set of familiar topics: generating a fourth notification indicative of a potential new-topic-related emerging event. In another example, the mention metric is a mention count and the metric range is a mention range; the mention metric is a rate of mention and the metric range is a rate range; or the mention metric is an acceleration of mention and the metric range is an acceleration range.

In another aspect, the technology relates to a system for detecting emerging events comprising: a processor; and a memory storing computer-executable instructions that, upon execution by the processor, causes the system to perform a set of operations. The set of operations comprises: obtaining current communication data associated with communication between a first plurality of sources during a first time period; segmenting the current communication data into a set of data segments; and determining, for a data segment, whether the data segment belongs to a familiar topic of a set of familiar topics. In various examples, the set of operations further comprises, when the data segment is determined to be belonging to a familiar topic: determining a mention metric of the familiar topic during the first time period; determining whether the mention metric falls outside of an associated metric range for more than an associated breach threshold; and generating, upon determining its mention metric falls outside of its associated metric range more than its associated breach threshold, a first notification indicative of a familiar-topic-related emerging event. Additionally or alternatively, the set of operations further comprises, when the data segment is determined to be belonging to none of the set of familiar topics: determining an unfamiliar segment count for a set of unfamiliar data segments determined as not belonging to a familiar topic, the set of unfamiliar data segments being similar to each other; determining whether its unfamiliar segment count meets or exceeds a critical mass threshold; and generating, upon determining its unfamiliar segment count meets or exceeds the critical mass threshold, a second notification indicative of a new-topic-related emerging event. In an example, the set of operations further comprises: obtaining historic communication data associated with communication between a second plurality of sources during a second time period prior to the first time period; and identifying the set of familiar topics based at least in part upon the historic communication data. In another example, the current communication data are time-stamped and include text communication data or transcribed audio communication data between the plurality of sources. In yet another example, one or more familiar topics of the set of familiar topics is labeled by a set of keywords that are conceptually salient but not textually similar to each other. In still another example, the one or more communication segments comprise one or more sequential sentences or a partial sentence. In another example, determining whether the data segment belongs to a familiar topic of a set of familiar topics comprises: transforming the data segment into a current feature vector; mapping the current feature vector onto a feature space, the feature space mapped with a set of familiar topic feature vectors associated with the set of familiar topics; for each familiar topic feature vector: determining a deviation distance between the current feature vector to the familiar topic feature vector; and determining a similarity score indicative of how similar the current feature vector is to an associated familiar topic; and determining a highest similarity score that exceeds a similarity score threshold, identifying the data segment as belonging to the familiar topic associated with the highest similarity score; or upon determining no similarity score exceeds the similarity score threshold, identifying the data segment as belonging to none of the set of familiar topics. In yet another example, the set of unfamiliar data segments are spatially within a critical mass boundary in the feature space. In a further example, the set of operations further comprises transforming the set of familiar topics into the set of familiar topic feature vectors; and mapping the set of familiar topic feature vectors onto the feature space. In still another example, determining a mention metric further comprises: determining a rate of mention as the mention metric based at least in part upon a first mention count during a first time segment of the first time period; and repeatedly updating the rate of mention based at least in part upon an immediate subsequent mention count during an immediate subsequent time segment of the first time period until the end of the first time period. In a further example, the rate of mention is a rolling rate of mention where a subsequent time segment overlaps partially with the time segment before it; or the rate of mention is a non-rolling rate of mention where the subsequent time segment has no overlap with the time segment before it. In another example, the set of operations further comprises: obtaining historic communication data associated with communication between a second plurality of sources during a second time period prior to the first time period; identifying the set of familiar topics based at least in part upon the historic communication data using the topic identification model; and predicting, for one or more familiar topics in the set of familiar topics, a rate range as the metric range based at least in part upon the historic communication data using a time-series prediction model; wherein the rate range includes a lower rate threshold and a higher rate threshold. In a further example, the set of operations further comprises: obtaining a detection sensitivity; wherein predicting the rate range is further based upon the detection sensitivity such that the rate range is wider when the detection sensitivity is lower and the rate range is narrower when the detection sensitivity is higher. In still another example, the set of operations further comprises: obtaining a detection sensitivity; and determining, for one or more familiar topics, a count threshold as part of the breach threshold based upon the detection sensitivity such that the count threshold is higher when the detection sensitivity is lower and the count threshold is lower when the detection sensitivity is higher. In yet another example, the set of operations further comprises: obtaining a detection sensitivity; and determining, for one or more familiar topics, a level threshold as part of the breach threshold based upon the detection sensitivity such that the level threshold is higher when the detection sensitivity is lower and the level threshold is lower when the detection sensitivity is higher. In still another example, the set of operations further comprises: for one or more familiar topics: recording a rolling breach count associated with a number of instances its mention metric meets or exceeds its associated metric range within a rolling time window; and updating the rolling breach count when the rolling time window moves forward. In yet another example, the set of operations further comprises: transmitting the first notification or the second notification to a recipient; wherein the first notification and the second notification comprise a description of the topic, a set of representative communication data available for review, and a mention trend. In a further example, the set of operations further comprises: when the data segment is determined to be belonging to a familiar topic: generating, upon determining its mention metric falls outside of its associated metric range, a third notification indicative of a potential familiartopic-related emerging event; or when the data segment is determined to be belonging to none of the set of familiar topics: generating a fourth notification indicative of a potential new-topic-related emerging event. In another example, the mention metric is a mention count and the metric range is a mention range; the mention metric is a rate of mention and the metric range is a rate range; or the mention metric is an acceleration of mention and the metric range is an acceleration range.

In a further aspect, the technology relates to a method for detecting emerging events. The method comprises: obtaining current communication data associated with communication between a first plurality of sources during a first time period; segmenting the current communication data into a set of data segments; determining, for a data segment, whether the data segment belongs to a familiar topic of a set of familiar topics; and when the data segment is determined to be belonging to none of the set of familiar topics: determining an unfamiliar segment count for a set of unfamiliar data segments determined as not belonging to a familiar topic, the set of unfamiliar data segments being similar to each other; determining whether its unfamiliar segment count meets or exceeds a critical mass threshold; and generating, upon determining its unfamiliar segment count meets or exceeds the critical mass threshold, a second notification indicative of a new-topic-related emerging event.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A computer-implemented method for detecting emerging events comprising:
determining, for a data segment, whether the data segment belongs to a familiar topic of a set of familiar topics;
when the data segment is determined to belong to the familiar topic:
determining whether a mention metric falls outside of an associated metric range for more than an associated breach threshold; and generating, upon determining the mention metric falls outside of the associated metric range more than the associated breach threshold, a first notification indicative of a familiar-topic-related emerging event;
when the data segment is not determined to belong to the set of familiar topics:
determining an unfamiliar segment count for a set of unfamiliar data segments;
determining whether the unfamiliar segment count exceeds a critical mass threshold; and
generating, upon determining the unfamiliar segment count exceeds the critical mass threshold, a second notification indicative of a new-topic-related emerging event.

2. The computer-implemented method of claim 1, further comprising:
obtaining historic communication data associated with communication between a second plurality of sources; and
identifying the set of familiar topics based at least in part upon the historic communication data.

3. The computer-implemented method of claim 1, wherein the data segment is obtained from communication data, and wherein the communication data is time-stamped and includes text communication data or transcribed audio communication data between a plurality of sources.

4. The computer-implemented method of claim 1, wherein one or more familiar topics of the set of familiar topics are labeled by a set of keywords that are conceptually salient but not textually similar to each other.

5. The computer-implemented method of claim 1, wherein one or more data segments comprise one or more partial sentences.

6. The computer-implemented method of claim 1, wherein determining whether the data segment belongs to a familiar topic of a set of familiar topics comprises:
transforming the data segment into a current feature vector;
mapping the current feature vector onto a feature space, the feature space mapped with a set of familiar topic feature vectors associated with the set of familiar topics;
for each familiar topic feature vector:
determining a deviation distance between the current feature vector to the familiar topic feature vector; and
determining a similarity score indicative of how similar the current feature vector is to an associated familiar topic; and
upon determining that one of the similarity scores exceeds a similarity score threshold, identifying the data segment as belonging to the familiar topic associated with the one of the similarity scores; or
upon determining no similarity score exceeds the similarity score threshold, identifying the data segment as not belonging to the set of familiar topics.

7. The computer-implemented method of claim 6, wherein when the set of unfamiliar data segments are spatially within a critical mass boundary in the feature space, clustering the unfamiliar data segments.

8. The computer-implemented method of claim 6, further comprising:
transforming the set of familiar topics into the set of familiar topic feature vectors; and
mapping the set of familiar topic feature vectors onto the feature space.

9. The computer-implemented method of claim 1, further comprising determining the mention metric, wherein determining the mention metric further comprises:

determining a rate of mention as the mention metric based at least in part upon a first mention count during a first time segment; and repeatedly updating the rate of mention based at least in part upon a subsequent mention count during a subsequent time segment of a time period.

10. The computer-implemented method of claim 9, wherein:

the rate of mention is a rolling rate of mention when the subsequent time segment overlaps partially with a prior time segment; or the rate of mention is a non-rolling rate of mention when the subsequent time segment does not overlap with the time segment before it.

11. The computer-implemented method of claim 9, further comprising:

obtaining historic communication data associated with one or more communications between a plurality of sources;

identifying the set of familiar topics based at least in part upon the historic communication data using a topic identification model; and predicting, for one or more familiar topics in the set of familiar topics, a rate range based at least in part upon the historic communication data using a time-series prediction model;

wherein the rate range includes a lower rate threshold and a higher rate threshold.

12. The computer-implemented method of claim 11, further comprising:

obtaining a detection sensitivity, wherein the rate range is wider when the detection sensitivity is lower and the rate range is narrower when the detection sensitivity is higher.

13. The computer-implemented method of claim 1, further comprising:

obtaining a detection sensitivity; and determining, for one or more familiar topics, a count threshold as part of the associated breach threshold based upon the detection sensitivity such that the count threshold is higher when the detection sensitivity is lower and the count threshold is lower when the detection sensitivity is higher.

14. The computer-implemented method of claim 1, further comprising:

obtaining a detection sensitivity; and determining, for one or more familiar topics, a level threshold as part of the associated breach threshold based upon the detection sensitivity such that the level threshold is higher when the detection sensitivity is lower and the level threshold is lower when the detection sensitivity is higher.

15. The computer-implemented method of claim 1, further comprising:

for one or more familiar topics:

recording a rolling breach count associated with a number of instances a mention metric exceeds the associated metric range within a rolling time window; and updating the rolling breach count when the rolling time window moves forward.

16. The computer-implemented method of claim 1, further comprising:

transmitting the first notification to a recipient;

wherein the first notification comprises a description of a topic, a set of representative communication data available for review, and a mention trend.

17. The computer-implemented method of claim 1, further comprising:

when the data segment is determined to belong to a familiar topic:

generating, upon determining a mention metric falls outside of the associated metric range, a third notification indicative of a potential familiar-topic-related emerging event; and when the data segment is determined to belong to none of the set of familiar topics:

generating a fourth notification indicative of a potential new-topic-related emerging event.

18. The computer-implemented method of claim 17, wherein the mention metric is an acceleration of mention and the associated metric range is an acceleration range.

19. A system for detecting emerging events comprising:

a processor; and a memory storing computer-executable instructions that, upon execution by the processor, causes the system to perform a set of operations, the set of operations comprising:

determine, for a data segment, whether the data segment belongs to a familiar topic of a set of familiar topics;

when the data segment is determined to belong to the familiar topic:

determine a mention metric of the familiar topic during a time period;

determine whether the mention metric falls outside of an associated metric range for more than an associated breach threshold; and generating, upon determining the mention metric falls outside of the associated metric range more than the associated breach threshold, a first notification indicative of a familiar-topic-related emerging event; or when the data segment is not determined to belong to the set of familiar topics:

determine an unfamiliar segment count for a set of unfamiliar data segments;

determine whether the unfamiliar segment count exceeds a critical mass threshold; and generating, upon determining the unfamiliar segment count exceeds the critical mass threshold, a second notification indicative of a new-topic-related emerging event.

20. A computer-implemented method for detecting emerging events comprising:

determining, for a data segment, whether the data segment belongs to a familiar topic of a set of familiar topics; and when the data segment is not determined to belong to the set of familiar topics:

determining an unfamiliar segment count for a set of unfamiliar data segments;

determining whether the unfamiliar segment count exceeds a critical mass threshold; and generating, upon determining the unfamiliar segment count exceeds the critical mass threshold, a notification indicative of a new-topic-related emerging event.

* * * * *